United States Patent [19]
Anderson et al.

[11] Patent Number: 5,317,669
[45] Date of Patent: May 31, 1994

[54] DIRECT CURRENT MOTOR SPEED CONTROL APPARATUS

[75] Inventors: James D. Anderson, San Antonio; John V. Searcy, II, Spring Branch, both of Tex.

[73] Assignee: John Svoboda, New Braunfels, Tex.

[21] Appl. No.: 878,342

[22] Filed: May 4, 1992

[51] Int. Cl.$^5$ ............................................. H02P 7/29
[52] U.S. Cl. .................... 388/829; 388/831; 388/840; 388/910; 318/139
[58] Field of Search ...................... 388/825–829, 388/830–831, 804, 811, 910, 838, 14 840; 318/139, 138, 9–13, 14

[56] References Cited

U.S. PATENT DOCUMENTS

| | | | |
|---|---|---|---|
| 3,803,473 | 4/1974 | Stich | 388/829 |
| 3,878,449 | 4/1975 | Wilhelm et al. | 321/15 |
| 4,011,492 | 3/1977 | Murphy et al. | 318/139 X |
| 4,532,460 | 7/1985 | Coale et al. | 318/139 |
| 4,599,548 | 7/1986 | Schultz | 318/139 X |
| 4,626,750 | 12/1986 | Post | 318/139 |
| 4,841,165 | 6/1989 | Bowles | 328/829 X |
| 4,871,952 | 10/1989 | Ishizaka et al. | 388/829 |

Primary Examiner—William M. Shoop, Jr.
Assistant Examiner—David Martin
Attorney, Agent, or Firm—Donald R. Comuzzi; Christopher L. Makay

[57] ABSTRACT

The present invention is a two unit electronic control system to reduce power demands imposed upon direct current power sources. The present invention comprises a contact/resistor network, a trigger generator, a pulse generator, a waveform stabilization circuit, a driver circuit, a voltage regulation circuit, a noise suppression circuit, a transient suppression circuit, a field effect transistor network and primary and secondary on/off control circuits. The input can be resistance, voltage, current or capacitance which is varied in response to an external stimulus. The chosen input is conditioned and applied to vary the duty cycle of a repeating pulse signal. That pulse signal is conditioned and applied to a switching device which controls the current from the DC power source to the load. The number of switching devices comprising the network will vary from one to many dependent upon the current carrying demand of the load and the current handling capability of the switching device utilized.

12 Claims, 5 Drawing Sheets

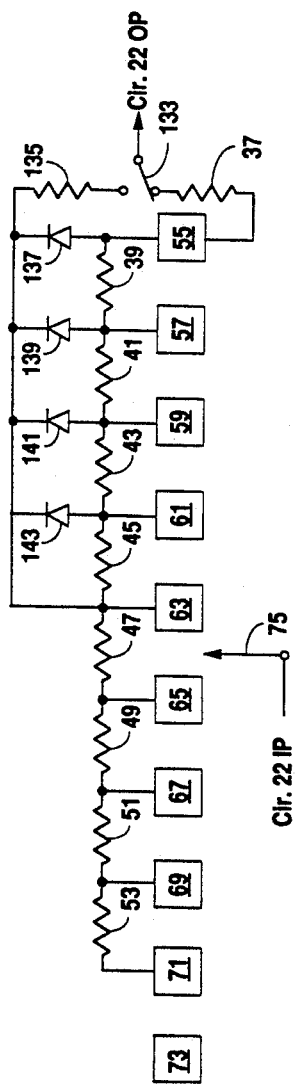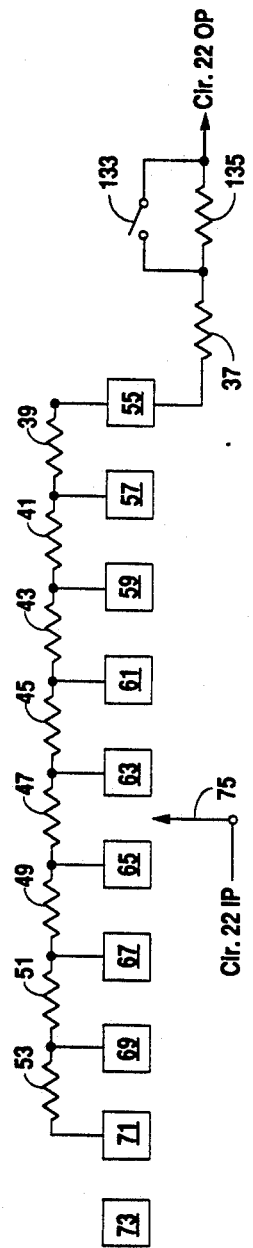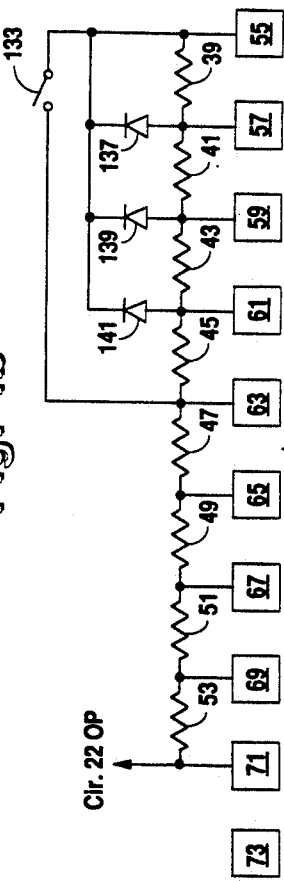

DIRECT CURRENT MOTOR SPEED CONTROL APPARATUS

BACKGROUND OF THE INVENTION

The present invention relates to an electronic control circuit to provide efficient operation of direct current devices. More particularly, but not by way of limitation, the present invention is described herein as a control system for regulating the speed of DC motors used in electric powered vehicles.

Originally, DC motor speed control was effected utilizing resistor banks placed in series with the motor. During operation, the resistor banks are switched in and out in response to a motor speed signal. Although that method is simple in concept and easy to implement, it is extremely inefficient because a portion of the power draws from the power source is dissipated in the resistors and is wasted except at maximum motor speed. That occurs because the resistor banks may regulate the amount of power actually delivered to the motor and, therefore, motor speed, but they do nothing to alleviate the overall system load experienced by the DC battery. Thus, even though the resistor banks effectively control motor speed, they are extremely inefficient because any power not delivered to the motor is wasted as heat.

Improved systems employ silicon controlled rectifiers (SCR's) as current chopper control devices. Such systems provide a periodic on/off control that modifies the power to the drive motor and, thus, the resultant speed by variation of the "on-time" intervals. In that manner, the duty cycle (percent on-time) is adjusted. Although SCR systems are fairly effective, they are expensive, heavy, bulky, inefficient, generate excessive heat, and have poor load sharing characteristics when connected in parallel to serve large loads.

A more effective method of controlling the on/off cycle of power delivered to the motor is by using a power MOSFET (metal oxide semiconductor field effect transistor) network in place of the SCR's. A power MOSFET network is substituted for the SCR's because it takes up less space, is lighter, and is more energy efficient. One such system is U.S. Pat. No. 4,626,750 issued to Post. Post employs a power MOSFET network used as high-speed switches to deliver power to a motor using a periodic on/off cycle generated in response to an operator input. Post inputs an operator signal to a variable resistance to generate a signal representative of desired vehicle speed, and then compares that signal to a reference signal in order to determine the on/off cycle of conduction for the power MOSFET network. For example, at full speed, the power MOSFETS will conduct 100% of the time while at half speed, the power MOSFETS will conduct at approximately a 50% duty cycle. In that manner, significant improvement can be realized in battery life because with the exception of full speed, delivery of power to the motor occurs in varying durations at a fixed frequency.

Another advantage of the power MOSFET network is that it provides extremely fast switching times and allows operation at frequencies above the range of human hearing so that annoying audible tones are eliminated. However, operation at high frequencies creates voltage spikes as the power MOSFETS are switched on and off. These spikes must be suppressed to avoid component stress and degradation in overall efficiency.

A disadvantage of the Post system is the method used for voltage spike suppression. Post employs power diodes distributed through the power MOSFET network to provide for the voltage spike suppression. These diodes produce excessive heat which must be dissipated utilizing a heat sink. Unfortunately, the heat sink is also shared by the power MOSFET network and, additionally, acts as the conductor for the entire motor power control circuit. That configuration is extremely inefficient because the heat added by the diodes increases the resistance in the heat sink, thereby, inhibiting the current delivered to the motor.

A second disadvantage of the Post system is the use of two MOSFETs as switches to deliver the on/off signal to the power MOSFET network (see FIG. 5, numerals 178 and 180). During the on cycle, MOSFET 178 turns on to deliver voltage across the gates of each power MOSFET of the network, thus, turning them on. During the off portion of the cycle, MOSFET 178 turns off and MOSFET 180 turns on to ensure that the power MOSFET network is turned off. However, when MOSFET 180 is on, a path exists from +14 volts through resistors 212 and 210, diode 216, MOSFET 180, and resistor 190. Thus, a positive voltage exists across MOSFET 180 and resistor 190. That voltage also appears on the gates of the power MOSFET network. As a result, the MOSFETs are not completely turned off during the off portion of the cycle allowing a residual current flow through the MOSFETs and the motor. That current drain seriously reduces system efficiency, thereby degrading system operation and performance.

The off portion of the cycle occurs anytime the vehicle is not at full speed and includes when the vehicle is at rest without the key turned off. Only when the key is turned off will there be no off portion of the cycle. Most electric powered vehicles are simply turned on using the key and left on during the entire operating time. Thus, when a vehicle employing the Post system is operating at anything less than full speed, or more importantly, at rest, the path through MOSFET 180 will cause power to be lost.

In addition, a leakage path exists that drains battery power even with the key turned off. Referring to FIG. 1 of the Post patent, that path travels from battery 10, through resistor 104 and connection 34, across bottom electrode 26 to connection 37 and 126, and to control circuit 64. Further, referring to FIG. 5, connection 126 connects to the non-inverting input of comparator amplifier 224 through a resistor. A problem occurs because a second resistor connects the non-inverting input of comparator amplifier 224 to ground. That path bypasses key switch 100 and provides a current path to ground even when the key is off. Thus, both the constant drain along with the incomplete turn off of the power MOSFET network severely limits the battery's useful life between charges, and defeats the entire purpose of the Post system.

Accordingly, the present invention has been developed to eliminate the above problems. First, the present invention uses a separate heat sink and conductor components to provide an external and separate diode circuit which eliminates large voltage spikes without generating excessive heat. That diode circuit is composed of large capacity ultrafast switching diodes with very good load sharing characteristics necessary for voltage suppression without adding heat to the assembly. Second, the present invention has eliminated the MOSFET switches as a means to turn on and off the power MOS- FET network to produce conduction and non-conduction. Finally, the leakage paths that unnecessarily drain the power source have been eliminated. The present invention, therefore, provides a design which is much simpler than conventional systems while delivering increased performance and extending battery charge life.

SUMMARY OF THE INVENTION

The present invention is a two piece solid state electronic circuit used to control power delivery to direct current devices such as DC electric motors operated to propel electric vehicles. The present invention comprises a signal generation unit and a power control unit. The signal generation unit comprises a contact/resistor network, a trigger generator circuit, a pulse generator circuit, a secondary on/off circuit, a waveform, stabilization circuit, and a driver circuit. The power control unit comprises a voltage regulation circuit, a noise suppression circuit, a primary and on/off circuit, a field effect transistor network and a transient suppression circuit.

The contact/resistor network provides a means by which an operator may generate a control signal to regulate motor speed. The network translates the operators actions (e.g, stepping on an accelerator) into an electrical signal (operator input signal) that directs motor response. In response to the operator input signal, the trigger generator generates a series of short duration pulses at a desired frequency which feed into the pulse generator circuit. These trigger pulses initiate the off-time portion of the power control cycle. Upon start up, the off-time portion is maximized so that power to the motor is at a minimum.

The power control cycle consists of an on-time portion and an off-time portion, both of which are varied in accordance with the operator input signal. That is, an increasing operator input results in a decrease in off-time and a corresponding increase in on-time. On-time, expressed as a percentage of the total power control cycle (which is constant), is referred to as the duty cycle. For example, when on-time equals off-time, the duty cycle equals 50% (i.e., power is on for 50% of the total power control cycle).

The pulse generator receives the short duration trigger pulses produced by the trigger generator and generates a series of new pulses, with each new pulse corresponding to a received pulse. The widths of the new pulses, which are dependent upon the operator input signal, vary from 0 to the total time between trigger pulses. Thus, the duty cycle of the pulse generator output varies from 0 to 100%.

The output (i.e. the duty cycle signal) of the pulse generator circuit feeds into an amplifier where it is amplified. That amplified signal then feeds into the field effect transistor (FET) switching network. During the on portion of the duty cycle, the FETs conduct, thereby delivering power to the motor from the constant DC current source. However, during the off portion, the FETs do not conduct and power is removed from the motor. Thus, through successive duty cycles, the power delivery to the motor and, therefore, vehicle speed can be regulated.

The secondary on/off circuit provides for cessation of motor operations with power still applied to the control circuits.

The waveform stabilization circuit conditions the output pulse train waveform.

The driver circuit conditions the duty cycle waveform so that it might be applied to the FET network.

The voltage regulation circuit conditions a higher DC voltage to a reliable and constant lower level source of power for the electronic control circuits.

The noise suppression circuit filters any noise resulting from the switching of the FET network.

The primary on/off circuit controls the application or removal of power from all element of the system.

The FET network is used as a high current capacity, rapid response electronic switch whose action controls the application of power to the motor in accordance with the duty cycle waveform.

The transient suppression circuit prevents voltage spikes that would ordinarily result from the collapsing magnetic field in the motor during the on to off transition.

BRIEF DESCRIPTION OF THE DRAWINGS

FIGS. 4a-c are schematic diagrams depicting modifications to the contact/resistor network which limit vehicle reverse speed.

DETAILED DESCRIPTION OF THE PREFERRED EMBODIMENT

Figure 1:
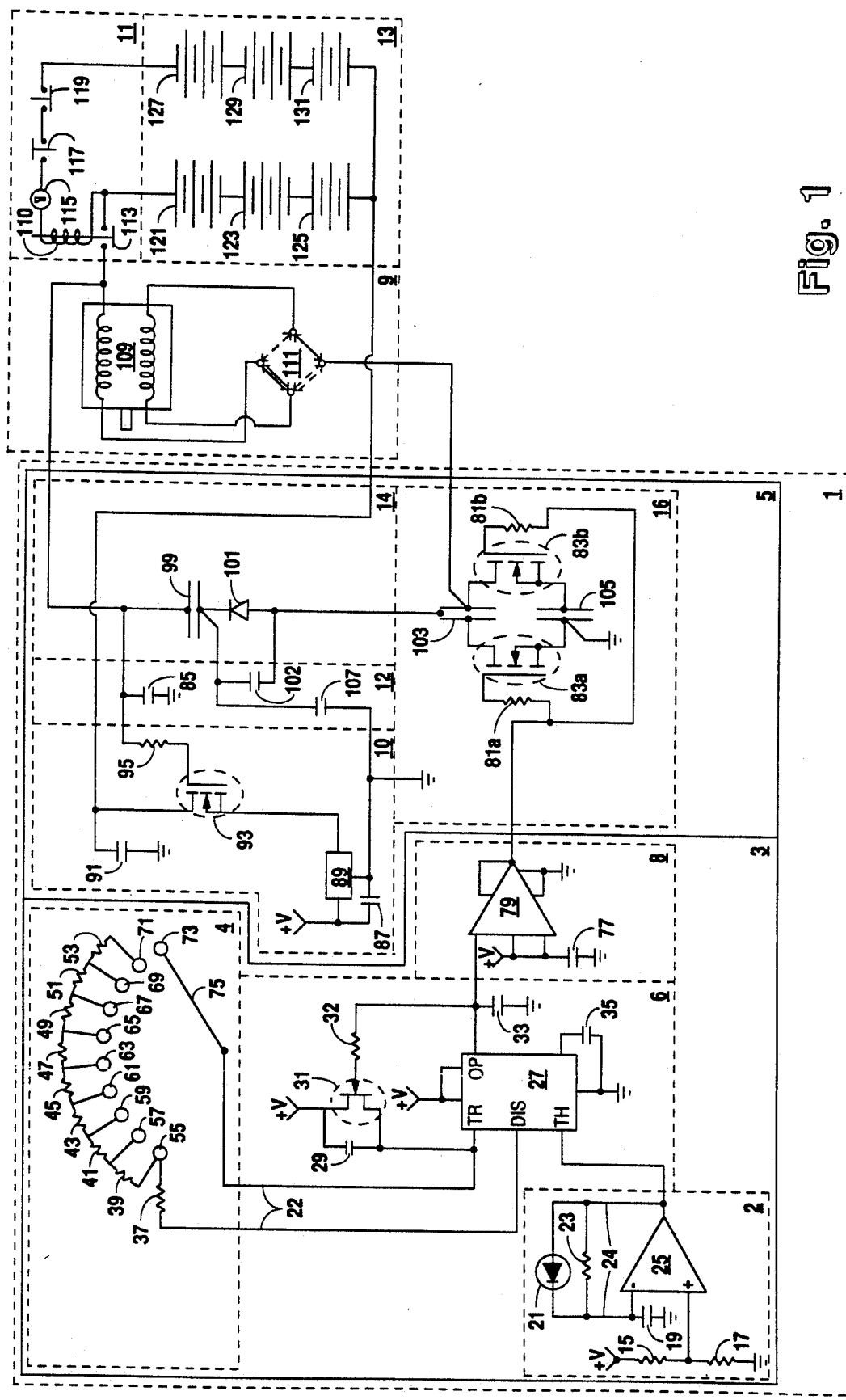
FIG. 1 is a schematic diagram of the preferred embodiment of the present invention showing its functional elements, their interconnection, and the individual components of which they are comprised.
Figure 3:
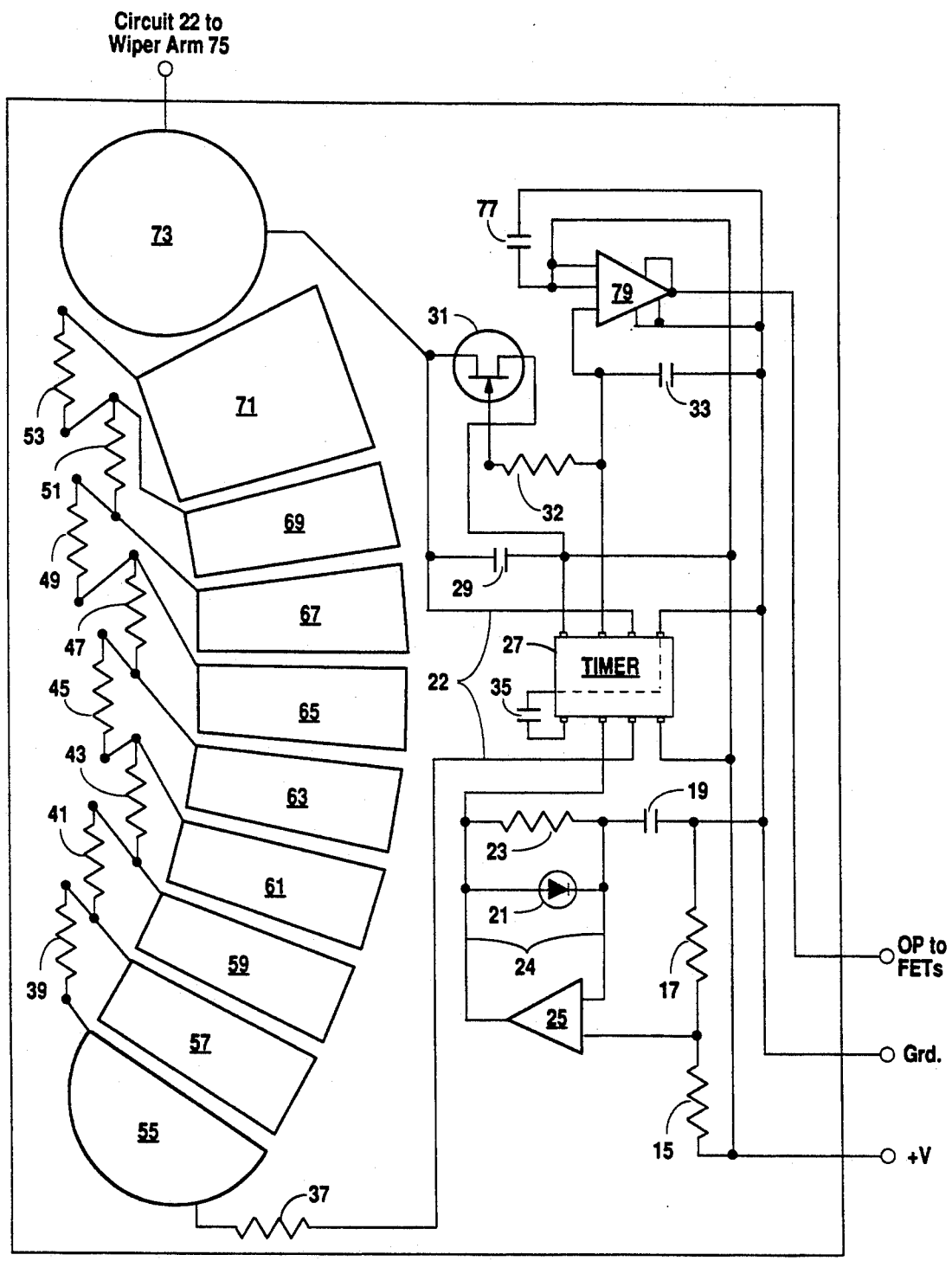
FIG. 3 depicts the preferred component layout of the signal generation unit of the present invention.

Referring to FIGS. 1 and 3, the DC motor control system of the preferred embodiment of the present invention will be described. The system is energized when an operator closes key switch 115, closes forward/neutral/reverse (FR) switch 111 which closes limit switch 117, and depresses the accelerator (not shown) which closes limit switch 119. These actions energize solenoid 110 which closes contact 113, thereby, allowing application of battery voltage to voltage regulator circuit 10 and motor 109. Inside voltage regulator circuit 10, the battery voltage activates MOSFET 93 which supplies a fraction of the battery voltage to voltage regulator 89. Capacitor 91 eliminates noise at the input to MOSFET 93, while capacitor 87 eliminates noise at the output of regulator 89. The output of regulator 89 provides and maintains the supply voltage required for the operation of the control system of the present invention. That supply voltage is represented by "+v" throughout the Figures.

With switches 115 and 117 closed, but prior to the depression of the accelerator pedal, switch 119 remains open and +v is not applied to the system. Further, wiper arm 75, which is also operated by the depression of the accelerator, physically contacts only contact 73, creating an open circuit which prevents the activation of timer 27 (discussed herein). As long as timer 27 remains inactive, no power is delivered to the motor and the system is at rest. Thus, should switch 119 malfunction, allowing application of +v to the system, the motor would remain at rest because wiper 75 arm would continue in contact with contact 73, thereby, maintaining timer 27 of pulse generator circuit 6 inactive. Additionally, should an open condition occur at any external circuit connecting signal generation unit 3 to power control unit 5, motor 109 would be placed in a quiescent, rather than a runaway condition regardless of the state of switch 119.

Depression of the accelerator pedal, closes switch 119 and moves wiper arm 75 onto contact 71. Closure of switch 119 powers the system by applying +v, and moving wiper arm 75 onto contact 71 completes circuit 22, thus, causing capacitor 29 to charge through resistors 37–53. The output of timer 27 goes immediately into a high state until a trigger pulse from trigger generator circuit 2 (discussed herein) is applied at TH terminal of timer 27. However, during sustained operations, output of timer 27 remains low until the voltage of capacitor 29 reaches approximately ⅓ of +v, which is the TR terminal threshold. The resistance of resistor network (53, 51, 49, 47, 45, 43, 41, and 39) establishes the time required for capacitor 29 to reach that threshold voltage. Once the threshold voltage is reached, timer 27 is biased to a high output state. As the operator further depresses the accelerator, wiper arm 75 traverses subsequent contacts (i.e. 69, 67, etc.), thus, removing resistors (i.e. 53, 51, etc.) from circuit 22. Reducing the resistance of circuit 22 decreases the charging resistance of capacitor 29. That reduction diminishes the time required for capacitor 29 to reach ⅓ of +v and, thus, also reduces the time the output of timer 27 remains in the low state. Because the frequency of the power control cycle remains constant, the shorter the duration of the low output state, the longer the duration of the high state. A longer high state results in a higher duty cycle and, thus, a higher average of power delivered to the motor which results in a higher vehicle speed. That is accomplished as follows.

Trigger generator circuit 2 provides precise control of the frequency of the power cycle of the DC motor. +v is applied to resistor 15 which along with resistor 17 forms a voltage divider to provide a reference voltage level across the non-inverting input of amplifier 25. A portion of that input is fed back to the inverting input through diode 21. With the circuit at rest (i.e. no power being applied to the motor), capacitor 19 is discharged, and the voltage at the inverting input to amplifier 25 is low. When power is applied, the above input combination causes the output of amplifier 25 to go to the high state. Capacitor 19 begins to charge rapidly through diode 21, and when its voltage exceeds the reference voltage at the non-inverting input the output switches to the low state. Capacitor 19 then begins to discharge through resistor 23, and when the capacitor voltage goes below the reference voltage, the output goes high and the cycle is repeated. The rapid charging of the capacitor through diode 21 gives rise to a short duration positive going pulse. The extended discharge through the resistor establishes the repetition rate of the pulses. That train of pulses acts as the trigger input for timer 27.

Figure 2A:
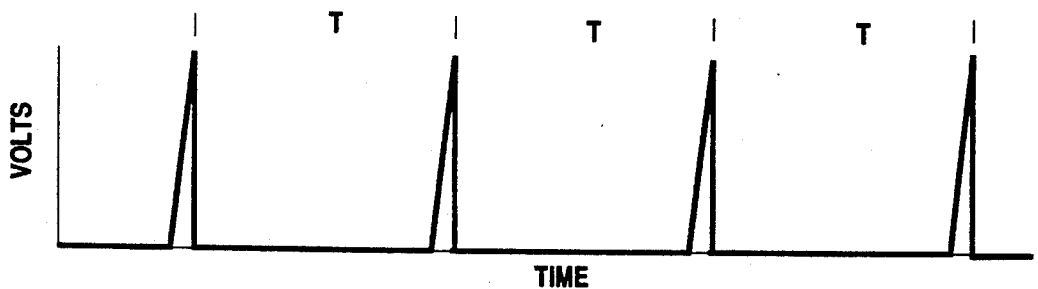
FIG. 2a shows the output waveform of the trigger generator.

Referring to FIG. 2a, the waveform output of trigger generator circuit 2 will be described. Each positive pulse from trigger generator circuit 2 initiates a timing cycle and, thus, determines the power waveform frequency of the system. The repetition time period T is constant through all levels of operation. The low output portion of the waveform is held at or near ground, and the positive portion exceeds the triggering threshold of pulse generator circuit 6.

Before application of the trigger pulse from trigger generator circuit 2 to the TH input of timer 27, the output of timer 27 is at a high voltage state. When the trigger pulse appears, the output immediately switches to a low state. That action turns off FET 31, which is an n-channel junction field-effect transistor, thus, beginning the charging of capacitor 29. The charge rate of capacitor 29 is determined by the position of wiper arm 75 as described above. The lower the number of the wiper arm position, the faster the charge rate of capacitor 29, the higher the wiper arm position number, the slower the charge rate. Thus, the time the output of timer 27 is held in the low state is controlled by the position of wiper arm 75. Components are chosen so that at minimum resistance the duration of the high state exceeds the time between trigger pulses. That allows the duty cycle of the output of timer 27 to be varied from 0% to 100%.

The output of pulse generator circuit 6 is fed to driver circuit 8. Driver circuit 8 comprises amplifier 79 and capacitor 77 which provide the necessary drive current levels for the gates of the power MOSFETs in power MOSFET network 16. The varying duty cycle waveform from timer 27 is reflected at the output of driver circuit 8. The waveforms are identical, except the driver output has much more current capacity. That increased current capacity is necessary to charge the combined gate capacitance of the bank of power MOSFET devices. Because the duty cycle may be varied from 0 to 100%, motor speed is controllable over the entire range of its capability. The advantage of using a varying duty cycle to control the motor is, that, at any speed other than full speed, the motor is disconnected from the power source for a portion of the control cycle. Thus, slower speeds diminish the drain on the source, resulting in greater efficiency of system operation. In the case of batteries, the present invention, therefore, allows longer operation between charges and less unit down time which is reflected in reduced operational costs.

Power MOSFET network 16 controls the current flow through DC motor circuit 7 in accordance with the waveforms of FIGS. 2b–e or similar waveforms generated over the complete range of motor speeds. MOSFET Network 16 comprises n-channel enhancement mode power field effect transistor (FETs). For the purposes of disclosure, only two FETs are indicated in FIG. 1. However, one of ordinary skill in the art will readily recognize that the load demand and the carrying capacity of the FETs utilized dictates the actual number of devices incorporated. The FETs are arranged in parallel with the entire network being connected in series with DC motor 109 and ground. Each source terminal of the FETs is connected to ground. Each FET drain terminal is connected to a common point which in turn is connected to the return side of motor circuit 7 through FR circuit 9. The gates of FETs 83a and 83b accept the output of driver amplifier 79 through resistors 81a and 81b, respectively. The individual FETs act as high speed switches to complete the path from the return side of motor 109 to ground. Capacitor 91 eliminates noise at the input to regulator circuit 10, and capacitor 87 eliminates noise from the output. Capacitor 107 maintains constant voltage to regulator circuit 10 under high battery current conditions.

Figure 2B:
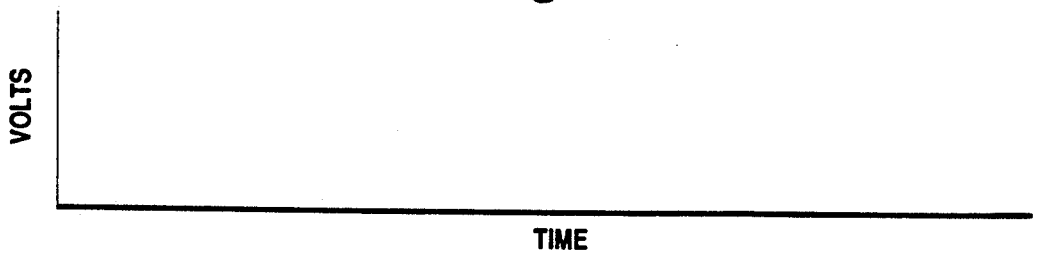
FIGS. 2b-e illustrate four example output waveforms from the pulse generator and driver circuits through the FET network.
Figure 2C:
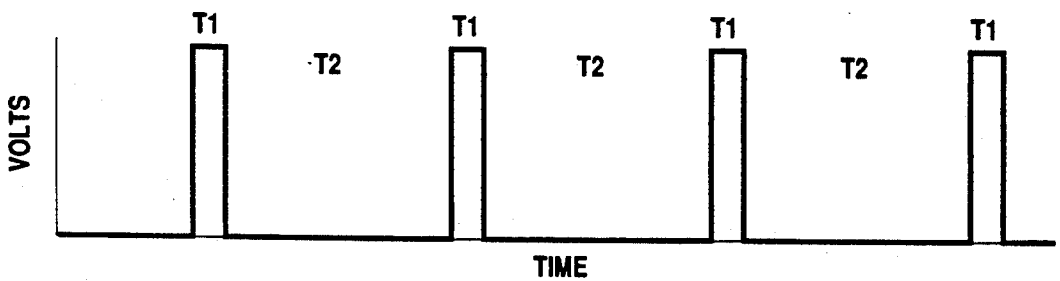

In operation, with the motor at rest, the waveform shown in FIG. 2b holds FETs 83a and 83b in the off state, thereby, preventing a current path from the motor circuit 7 to ground. As acceleration is initiated, short duration positive pulses such as those shown in FIG. 2c are applied to the gates of FETS 83a and 83b. Under these conditions, the FETs 83a and 83b are turned on during time T1 and off during time T2. FIG. 2c represents the minimum duty cycle required to initiate vehicle movement. To initiate the minimum duty cycle, the accelerator must be depressed so that wiper 75 arm contacts contact 71 of signal generation circuit 4 (see FIG. 1).

Using pulse trains to initiate vehicle movement improves over conventional continuous power application systems because it avoids the waste of energy experienced when the motor is pulsed continuously from 0% to the minimum current level required for movement. Additionally, an operator will not perceive any noticeable vehicular acceleration differences between the two control systems because vehicle inertia will provide the smoothing of the initial acceleration. Thus, with the proper selection of resistors in contactor/resistor network circuit 4, the vehicle will comfortably change speeds, and the operator will not experience abrupt speed changes. The step method of changing speeds, therefore, conserves more energy than continuous variation systems because of the inertia of the vehicle which basically constitutes the system load. At any point along the speed range of the vehicle, there is a finite amount of energy required to cause a perceptible change in the speed. These energy requirements decrease at the higher rates of speed. Accordingly, by judiciously choosing the resistor values and the number of steps in contactor/resistor network circuit 4, an acceleration curve can be established with which smooth vehicle operation can be realized with a corresponding increase in operational efficiency.

Figure 2D:
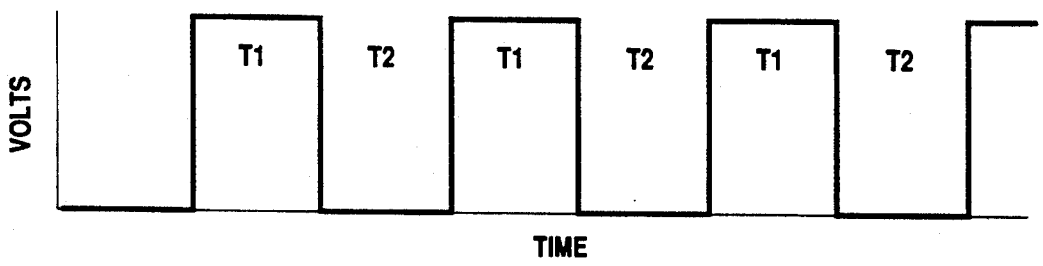
Figure 2E:
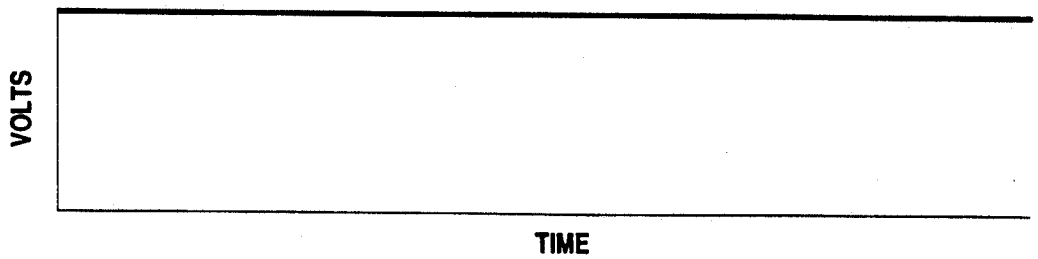

Upon further depression of the accelerator, the positive pulse widens as indicated in FIG. 2d providing an intermediate duty cycle and intermediate vehicle speed. With the accelerator fully depressed, the waveform of FIG. 2e is applied to the MOSFET network and FETs 83a and 83b are biased on for 100% of the time providing maximum motor torque and full vehicle speed.

If volts is changed to amps in FIGS. 2b-e, a graphic representation of the current through the MOSFET network at the corresponding duty cycles is obtained.

Diode 101 and capacitor 102 are connected in parallel to the motor windings to provide a conditioned current path during the on to off transition of the power cycle. With the FETs conducting, current flows through motor 109 and a large magnetic field is produced in the motor windings When the FETs open the circuit, the magnetic field attempts to maintain the current flow and the voltage across the motor terminals reverses polarity. Since current through an inductor cannot change instantaneously, a circuit is required to provide a current path and allow the field to collapse without generating a large voltage spike. Diode 101 provides this circuit and, thus, sensitive components are protected and the next duty cycle application is prepared for. Capacitor 102 filters the waveform during the transition period. Diode 101 comprises one or more ultrafast power switching rectifiers with large current handling capabilities in a free-wheeling diode application.

DC input circuit 13 comprises serially connected batteries 121-131.

Capacitor 107 is connected in parallel with DC input circuit 13 and, during operation, serves to smooth any fluctuations in battery voltage, thereby, eliminating noise entering the control circuit from the battery circuit.

Referring to FIG. 3, the component layout of signal generation unit 3 will be described. For the purposes of disclosure, signal generation unit 3 will be described in detail for application to electric golf carts. However, one of ordinary skill in the art would recognize that the present invention may be utilized in any conventional DC apparatus. In the preferred embodiment, signal generation unit 3 is designed as a retrofit device which would utilize a golf carts existing accelerator switch plate, wiper arm, FR switch, solenoid limit circuit, and accelerator linkage, requiring no revision other than the rerouting of existing wiring.

Contacts 55 and 73 are made from placing original equipment contact studs and retrofit into existing holes to attach signal generation unit 3 to the accelerator switch plate. Contacts 57, 59, 61, 63, 65, 67, 69, and 71 are made of the same material and are the same thickness as contacts 55 and 73. The "off" contactor 73 is wider than the other contactors s that the existing wiper arm (see FIG. 1, numeral 75) has sufficient room to rest totally upon it without touching the low contactor 71, thereby, creating an open circuit and, thus, a motor "off" situation. That larger width also compensates for under or over travel resulting from wear or maladjustment of the various mechanical components in the accelerator linkage assembly. The low (71) and high (55) contactors are wider than the intermediate contactors (57, 59, 61, 63, 65, 67, and 69) but thinner than "off" contactor 73. The low contactor 71 is wider in order to allow the travel of the existing accelerator linkage to position the existing accelerator limit switch 119 into the closed or open position while the wiper is touching contactor 71. The closing (opening) of the microswitch activates (deactivates) solenoid 110 (see FIG. 1) which closes contact 113, thereby, allowing current to flow through the control circuits. Activation and deactivation of the control circuit occurring only when wiper arm 75 has circuit 22 closed reduces arc damage to the contacts. The "on" trip point of the microswitch occurs at the midpoint of the low contactor. The extra width of the low contactor, combined with the overlapping trip points of the microswitch, prevents the motor circuit from going into an on-off-on mode should the operator back-off slightly on the accelerator pedal immediately after start of vehicle motion. The high contactor 55 is wide enough to allow for under-travel resulting from mechanical wear or maladjustment. Additionally, the width allows the wiper brush to rest solely on the high contactor in order to achieve minimum resistance when only contactor/resistor network circuit 4 is utilized in a system which requires decreasing resistance to achieve a 100% duty cycle. The intermediate contactors (57, 59, 61, 63, 65, 67, and 69) may be of any width and number, with the width being a factor of available space, and the number of intermediate speeds required. That is, if there are more intermediate speeds and a shorter wiper travel length, the intermediate contactors must be narrower. Conversely, fewer intermediate steps and longer wiper travel lengths allow for wider intermediate contactors. Space between contractors must be kept wide enough to reduce the possibility of moisture related shorting between adjacent contactors. The spacing and size of the intermediate contactors can be configured for makebefore-break or break-before-make type of operation as desired. Additionally, contactor 73 is optional because of the disconnect function of accelerator switch 119.

The contactor assembly shown in FIG. 3 reduces resistance applied to circuit 22 but can be made to increase resistance by connecting circuit 22 to contacts 71 and 73 instead of contacts 55 and 73. The use of resistor 37 is optional, however, its use scales the overall acceleration curve. Resistors 37, 39, 41, 43, 45, 47, 49, 51, and 53 shape the acceleration curve as desired.

The physical characteristics of the contacts and the layout of the components will vary with circumstances. A resistor/capacitor combination determines the timing requirements for the system. The resistance is shown to be the varying factor with a fixed capacitor to obtain the performance desired. However, one of ordinary skill in the art will readily recognize that a varying capacitance network with a fixed resistance could be implemented.

Other similar systems use either a potentiometer or a network of remote discrete resistors to vary the resistance in their circuits. When applied to vehicles, these resistance devices are subject to constantly changing demands: movement wear, vibration, shock, dirt, dust, and moisture. Potentiometers produce continuous and thus smooth speed regulation and vehicle control. They are, however, less efficient than the disclosed embodiment and wear rapidly. Depending upon the nature of the wearing (rough, broken, worn, dead spots or eroded surfaces), vehicle performance can be affected in any number of ways (jerky or sporadic speed changes during acceleration, deceleration, or while cruising). At the extreme such vehicle operation could potentially be extremely hazardous to the passengers in the vehicle. More robust potentiometers are cost prohibitive for production use.

Contactors along with components and connections are cast into a single unit to provide protection and insulation for the sensitive electric components. Signal generator unit 3 is located remotely from the power control unit 5 and is less subject to potential external heat. The location of the unit on the accelerator plate provides access to air movement to aid in removal of internally generated heat. The contactor/resistor network 5 portion of circuit 3 can be produced without the timing components for use with any other device requiring a variable resistance or capacitance circuit.

Referring to FIG. 4a, a circuit for limiting the reverse speed of systems utilizing a decrease of resistance to increase vehicle speed will be described. Reverse speed limit switch 133 is a single pole double throw snap action switch activated by FR switch 111. With the FR switch in the forward position, current flows through resistors 37, 39, 41, 43, 45, 47, 49, 51, and 53. With the FR switch in the reverse position; current which normally would flow through resistors 37, 39, 41, 43, and 45, flows through resistor 135 only. In either case, current flows from wiper arm 75 into the resistor network and out through switch 133. In the forward position there are 9 steps of resistance. In the reverse position there are only 5 steps of resistance. That is accomplished as follows:

In the forward position diodes 137, 139, 141, and 143 provide a high impedance path so that resistors 39, 41, 43, and 45 cannot be shorted out or bypassed. Current must flow through those resistors and out through resistor 37 and switch 133. In the reverse position, however, resistors 37, 41, 43, and 45 are bypassed by a connection to resistor 135. Current now flows out through resistor 135 and switch 133. The value of resistor 135 is the sum of resistors 37, 39, 41, 43, and 45 and, thus, limits resistance and vehicle speed to the level established at contact 63.

Referring to FIG. 4b, a second embodiment of the circuit for limiting reverse speed in systems requiring decreasing resistance to produce an increase in vehicle speed will be described. In the forward position, reverse speed limit switch 133 is closed and resistor 135 is bypassed. In the reverse position, switch 133 is open and resistor 135 is in the current path. The resistance of the contact/resistor network is, thus, increased by the value of resistor 135.

Referring to FIG. 4c, a third embodiment of the circuit limiting reverse speed in systems requiring an increase of resistance to produce and increase in vehicle speed will be described. In the forward position switch 133 is open. When the accelerator is pressed wiper arm 75 moves from contact 73 to 71 and accelerator limit switch 119 completes solenoid circuit 110 (see FIG. 1) which applies DC power to the control system. As the accelerator is further depressed, wiper arm 75 continues to move to subsequent contacts (i.e. 69, 67, etc.), thus, increasing the resistance at each contact until the required maximum is reached at contact 55. Diodes 137, 139, and 141 prevent the bypassing of resistors 39, 41, and 43. In the reverse position switch 133 is closed. That effectively removes resistors 39, 41, 43, and 45 from the network, thus limiting the maximum resistance of the network.

Although a vehicle traction motor has been used as the example in the foregoing descriptions, the present invention may be used in conjunction with any application whereby intermittent control of a power source is preferred. Multiple speed limit systems may be installed on the contact/resistor network to limit either forward or reverse speed as required for different conditions. Limit switch 133 may be mechanical or electronic (e.g. a transistor) and controlled by an electrical signal or other stimulus (i.e. temperature, pressure or lack of it, light, sound, etc.).

Figure 5:
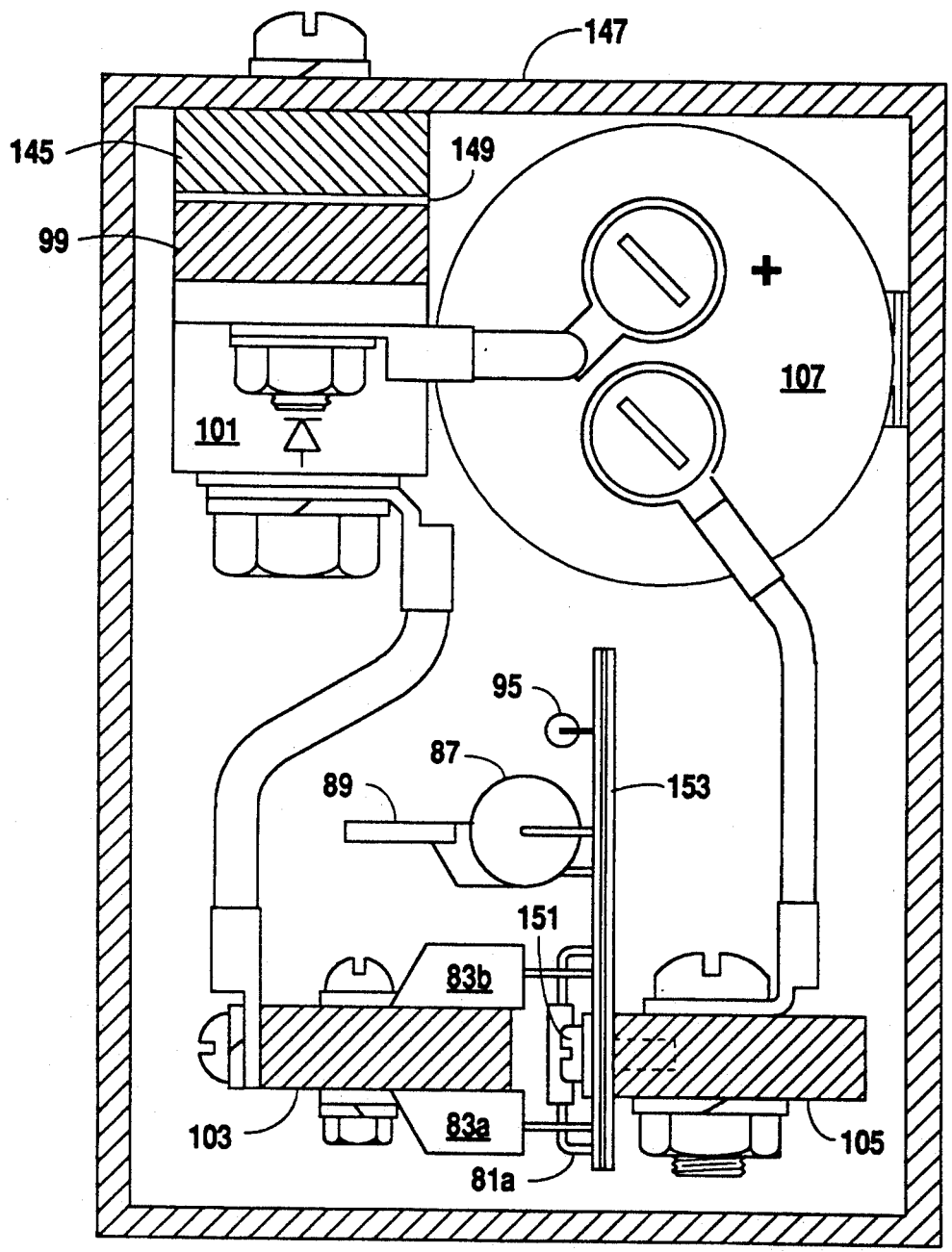
FIG. 5 is a cross section detail of the power control unit of the preferred embodiment of the present invention.

Referring to FIGS. 1 and 5, power control unit 5 of the preferred embodiment of the present invention will be described. The placement of the major current carrying components in close proximity to each other constitutes an improvement over the prior art. That arrangement allows for the efficient reduction of potential heat production without the use of custom made components or heat sinks.

A strip of plating on board 153 is held in contact with source bus bar 105 by machine screws 151. Leads from that strip to the source terminals of the MOSFETs are only 0.1 inches long, as are the plating connections from the gate terminals to supply resistors 81a and b. The drain terminals of the MOSFETs are physically connected not only at board 153, but they are also electrically connected to the large metal heat tabs which are bolted to drain circuit bus 103. That arrangement allows for the shortest length of high current connection. The ends of buses 103 and 105 extend out both ends of the unit to allow for maximum diversity of circuit application and to aid in heat dissipation.

Positive bus bar 99, heat bus 145, and the heat sink/cathode terminal for diode 101 are all bolted together to form a single unit. Case 147 is thermally connected to the unit to dissipate heat generated by diode 101. It is electrically isolated from the unit by thermally conductive/current blocking film 149 and nylon isolators. The ends of positive bus bar 99 extend past the units endcaps for the same reasons as buses 103 and 105. The anode terminal of diode 101 is connected to drain bus 103 by a short length of large gauge wire to complete transient suppression circuit 14.

Capacitor 107 is connected to positive bus 99 and source bus 105 with short heavy gauge wire to create noise suppression circuit 12.

Although the preferred embodiment discloses a control circuit for direct current devices, one skilled in the art will readily recognize that the present invention may be modified to control alternating current (ac) devices. Specifically, different value capacitors and resistors which would revise the pulse width to the desired frequency could be substituted for the capacitors and resistors of the preferred embodiment. Additionally, a triac network must be substituted for MOSFET network 16. Thus, with the correct pulse frequency and the triac network, the present invention will control ac devices.

From the foregoing description and illustration of this invention, it is apparent that various modifications can be made by reconfigurations or combinations to produce similar results. It is, therefore, the desire of the Applicant not to be bound by the description of this invention as contained in this specification, but to be bound by the claims as appended hereto.

We claim:

1. A control system for varying the duty cycle of current supplied to a utilizing device from a constant DC current source, comprising:
   a contact/resistor network means for producing a variable resistance in response to an operator input;
   a timer means coupled to said contact/resistor network for producing a duty cycle signal representative of said operator input;
   a trigger signal generator means coupled to said timer means for producing a trigger signal which establishes the frequency of said duty cycle signal;
   a threshold signal generator means coupled to said contact/resistor network means and said timer means for producing a threshold signal which establishes the duration of said duty cycle signal;
   an amplification means coupled to said timer means for amplifying said duty cycle signal; and
   a high speed electronic switching means connected between said amplification means and said utilizing device to deliver said current from said constant DC current source to said utilizing device in response to said duty cycle signal.

2. The control system according to claim 1 further comprising at least one transient suppression diode in reverse series connection with said switching network means and in reverse parallel connection with said utilizing device to serve as a free wheeling diode for the elimination of high voltage spikes.

3. The control system according to claim 2 further comprising a capacitor connector between cathode and anode terminals of said suppression diode to condition and filter said current delivered to said utilizing device through said switching network means.

4. The control system according to claim 3 further comprising a second capacitor connected in parallel with said constant DC current source to provide noise suppression.

5. The control system according to claim 1 further comprising a voltage regulation means for providing regulated voltage to said trigger signal generator means, said timer means, said threshold signal generator means, and said amplification means.

6. The control system according to claim 1, wherein said high speed electronic switching means comprising a plurality of parallel connected field effect transistors coupled to said constant DC current source and said utilizing device.

7. The control system according to claim 6, wherein said duty cycle signal controls the on/off conduction cycle of said plurality of field effect transistors.

8. The control system according to claim 1, wherein said contact/resistor network means further comprising a plurality of diodes and resistors controlled by an external switch to limit the range of said operator input signal.

9. The control system according to claim 1, wherein said threshold signal varies inversely to changes in the resistance of said contact/resistor network means.

10. A power control unit capable of delivering high current to a utilizing device, comprising:
    a housing;
    a plurality of field effect transistor pairs;
    a printed circuit board for providing a source circuit for said plurality of transistor pairs;
    a first busbar physically connected to said housing but electrically isolated from said housing to function as a terminal for a positive input and as a heat sink for a freewheeling diode;
    a second busbar connected to the drain heat tab terminals of said plurality of field effect transistor pairs to function as a common drain bus, as a drain input, and an a heat sink for said plurality of field effect transistor pairs;
    a third busbar connected both physically and electrically to said source circuit of said printed circuit board to function as a terminal for the ground connected and as the support for said printed circuit board; and
    said first, second, and third busbars being configured to extend beyond both ends of said housing to provide improved versatility in the attachment of said inputs and to provide improved heat dissipation.

11. The power control unit according to claim 10, wherein said freewheeling diode connects at its anode to said first busbar and at its cathode to said second busbar.

12. The power control unit according to claim 10 further comprising a capacitor connected between said first busbar and said third busbar.

* * * * *